United States Patent
Esposito et al.

(10) Patent No.: US 11,451,473 B2
(45) Date of Patent: Sep. 20, 2022

(54) EGRESS MIRRORING PACKETS TO CPU USING RECIRCULATION

(71) Applicant: Arista Networks, Inc., Santa Clara, CA (US)

(72) Inventors: Robert Esposito, Manchester, NH (US); William Darby, Nashua, NH (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 113 days.

(21) Appl. No.: 16/883,097

(22) Filed: May 26, 2020

(65) Prior Publication Data

US 2021/0377171 A1 Dec. 2, 2021

(51) Int. Cl.
| | |
|---|---|
| *H04L 45/745* | (2022.01) |
| *H04L 12/46* | (2006.01) |
| *H04L 69/22* | (2022.01) |
| *H04L 12/413* | (2006.01) |
| *H04L 43/026* | (2022.01) |

(52) U.S. Cl.
CPC ........ *H04L 45/745* (2013.01); *H04L 12/4633* (2013.01); *H04L 12/4641* (2013.01); *H04L 69/22* (2013.01)

(58) Field of Classification Search
CPC .............. H04L 45/745; H04L 12/4633; H04L 12/4641; H04L 69/22; H04L 12/413; H04L 43/026
See application file for complete search history.

(56) References Cited

U.S. PATENT DOCUMENTS

| | | | |
|---|---|---|---|
| 10,644,985 B1 * | 5/2020 | Rathnamaiah .......... | H04L 69/16 |
| 2006/0114831 A1 * | 6/2006 | Buduma ............... | H04L 49/351 |
| | | | 370/241 |
| 2007/0171838 A1 * | 7/2007 | Baden ................. | H04L 45/7453 |
| | | | 370/252 |
| 2021/0243253 A1 * | 8/2021 | Pang ....................... | H04L 45/74 |

OTHER PUBLICATIONS

S. Miano, F. Risso and H. Woesner, "Partial offloading of OpenFlow rules on a traditional hardware switch ASIC," 2017 IEEE Conference on Network Softwarization (NetSoft), 2017, pp. 1-9, doi: 10.1109/NETSOFT.2017.8004107.*

* cited by examiner

*Primary Examiner* — Asghar H Bilgrami
(74) *Attorney, Agent, or Firm* — Fountainhead Law Group P.C.

(57) ABSTRACT

Egress mirroring packets to a CPU includes processing ingress packets in a forwarding pipeline; egressing one or more packets from the forwarding pipeline to a first physical port of the switch; mirroring the one or more packets on the first physical port to a second physical port of the switch; recirculating the one or more packets on the second physical port to the forwarding pipeline, wherein the one or more packets on the second physical port become ingress packets on the second physical port and processing the recirculated one or more packets in the forwarding pipeline includes identifying packets that ingress on the second physical port; and sending the identified packets to a central processing unit (CPU) in the switch.

20 Claims, 9 Drawing Sheets

MIRRORING TABLE 500

| PORT | METADATA |
|---|---|
| et1 (egress port 270y) | session1 |
| et2 (egress port 270z) | session2 |
| et3 | session3 |
| et4 | session3 |
| ... | ... |

FIG. 5

EGRESS MIRRORING PACKETS TO CPU USING RECIRCULATION

BACKGROUND

Packet forwarding in a network switch involves the determination of a next hop device for a received network packet to which the packet is transmitted in order to forward the packet to its destination in the network. Packet forwarding uses forwarding information and configuration rules to prepare the received packet for transmission to the next hop device. Troubleshooting issues relating to physical connectivity, interface, and switch hardware issues may require being able to monitor packet flow and inspect certain packets.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 shows a mirroring table according to some embodiments.

DETAILED DESCRIPTION

In a network device, a specialized forwarding application-specific integrated circuit (ASIC) may be used to rapidly make forwarding decisions. As the network device forwards packets, the packets may be analyzed to monitor and troubleshoot operation of the switch. Some forwarding ASICs do not natively support sending egress packets to the CPU for diagnostic purposes, though. Instead, patch cables may be connected at the front of the network device to send outgoing packets somewhere else for analysis, but it would be cumbersome to dispatch a technician to connect and disconnect patch cables, as well as provision a packet capture appliance, each time diagnostics are to be performed. Embodiments in accordance with the present disclosure provide mechanisms for redirecting packets to the CPU for monitoring and/or inspection purposes.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
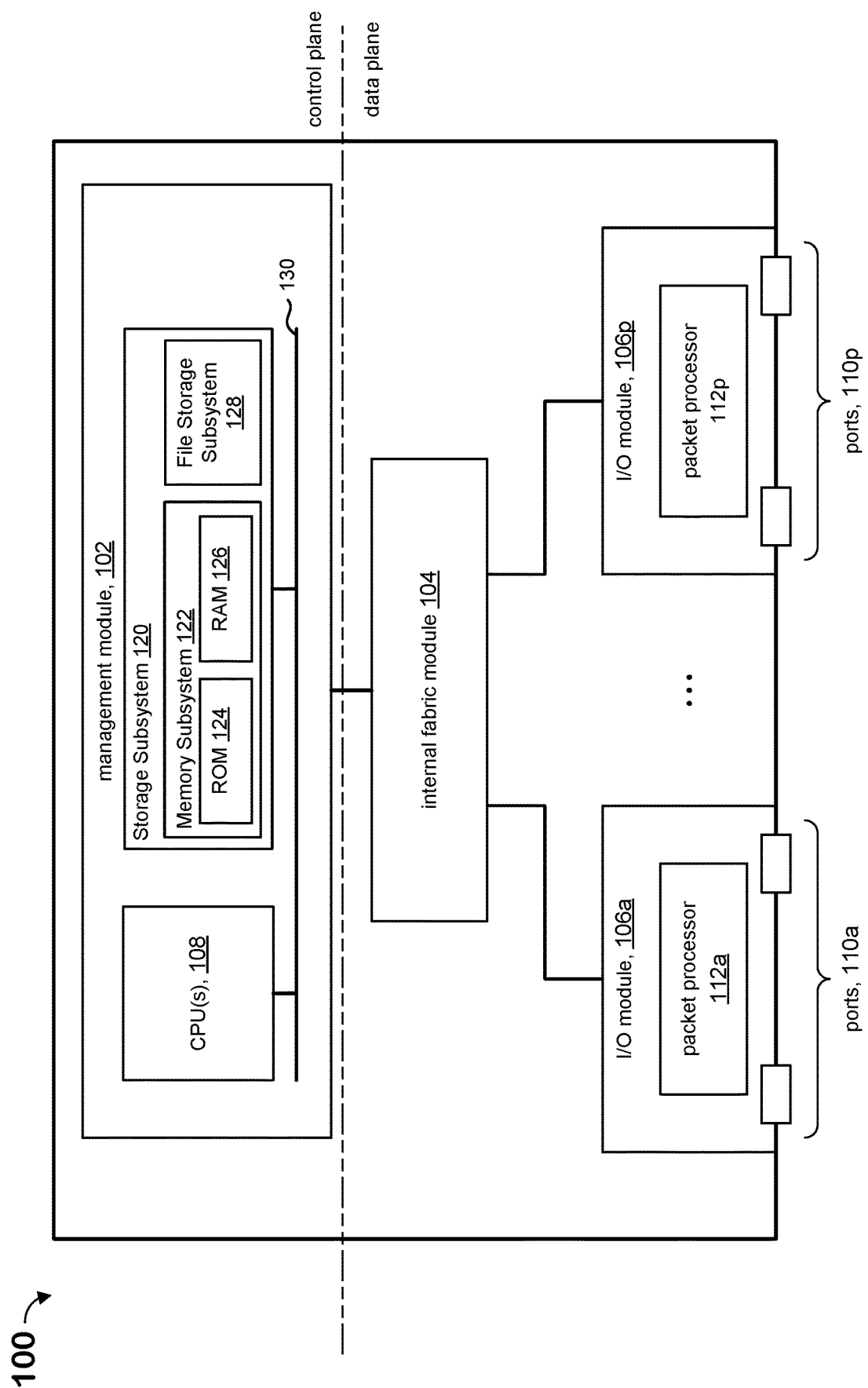
FIG. 1 shows a simplified block diagram of a networking device in accordance with some embodiments.

FIG. 1 depicts an example of a network device 100 in accordance with some embodiments of the present disclosure. In some embodiments, network device 100 can be a switch. As shown, network device 100 includes a management module 102, an internal fabric module 104, and a number of I/O modules 106a-106p. Management module 102 includes the control plane (also referred to as control layer or simply the CPU) of network device 100 and can include one or more management CPUs 108 for managing and controlling operation of network device 100 in accordance with the present disclosure. Each management CPU 108 can be a general-purpose processor, such as an Intel®/AMD® x86 or ARM® microprocessor, that operates under the control of software stored in a memory, such as random access memory (RAM) 126. Control plane refers to all the functions and processes that determine which path to use, such a routing protocols, spanning tree, and the like.

Internal fabric module 104 and I/O modules 106a-106p collectively represent the data plane of network device 100 (also referred to as data layer, forwarding plane, etc.). Internal fabric module 104 is configured to interconnect the various other modules of network device 100. Each I/O module 106a-106p includes one or more input/output ports 110a-110p that are used by network device 100 to send and receive network packets. Input/output ports 110a-110p are also known as ingress/egress ports. Each I/O module 106a-106p can also include a packet processor 112a-112p. Each packet processor 112a-112p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 102 includes one or more management CPUs 108 that communicate with storage subsystem 120 via bus subsystem 130. Other subsystems, such as a network interface subsystem (not shown in FIG. 1), may be on bus subsystem 130. Storage subsystem 120 includes memory subsystem 122 and file/disk storage subsystem 128 represent non-transitory computer-readable storage media that can store program code and/or data, which when executed by one or more management CPUs 108, can cause one or more management CPUs 108 to perform operations in accordance with embodiments of the present disclosure.

Memory subsystem 122 includes a number of memories including main RAM 126 for storage of instructions and data during program execution and read-only memory (ROM) 124 in which fixed instructions are stored. File storage subsystem 128 can provide persistent (i.e., non-volatile) storage for program and data files, and can include a magnetic or solid-state hard disk drive, and/or other types of storage media known in the art.

One or more management CPUs 108 can run a network operating system stored in storage subsystem 120. A network operating system is a specialized operating system for network device 100 (e.g., a router, switch, firewall, and the like). For example, the network operating system may be Arista Extensible Operating System (EOS), which is a fully programmable and highly modular, Linux-based network operating system. Other network operating systems may be used.

Bus subsystem 130 can provide a mechanism for letting the various components and subsystems of management module 102 communicate with each other as intended. Although bus subsystem 130 is shown schematically as a single bus, alternative embodiments of the bus subsystem can utilize multiple busses.

Figure 2:
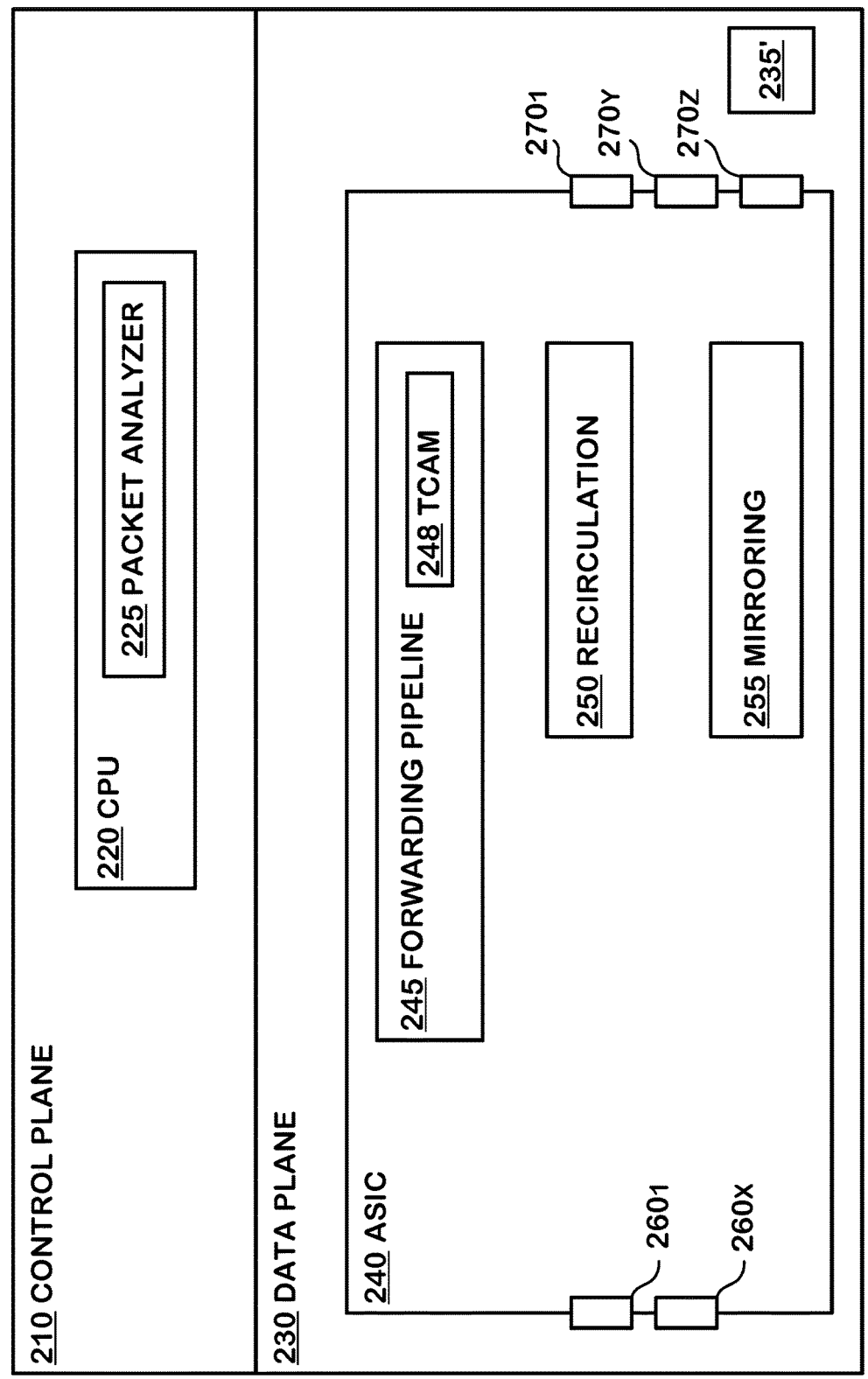
FIG. 2 illustrates a simplified block diagram of a networking device in accordance with various embodiments.

FIG. 2 is a simplified block diagram of network device 200, according to some embodiments. Network device 200 may be an embodiment of network device 100 (FIG. 1). Network device 200 may comprise control plane 210 and data plane 230. Control plane 210 may include CPU 220 which may be an embodiment of one or more management CPUs 108 (FIG. 1). CPU 220 may execute packet analyzer 225 which represents any suitable functionality to analyze or monitor packets captured in accordance with the present disclosure.

Data plane 230 may include forwarding application specific integrated circuit (ASIC) 240. ASIC 240 may be a forwarding hardware component as described in FIG. 1. Forwarding ASIC 240 may comprise forwarding pipeline 245, recirculation logic 250, mirroring logic 255, ingress ports $260_1$-$260_X$, and egress ports $270_1$-$270_Z$.

Network packet 235 may be a formatted unit of data carried by a packet switched network and comprise control information and data (the payload). Control information provides data for delivering the payload, such as source and destination network addresses, error detection codes, sequencing information, and the like.

Forwarding Pipeline 245

Forwarding pipeline 245 may include a content-addressable memory, such as ternary content addressable memory (TCAM) 248, to make real-time packet forwarding decisions to determine an egress port for network packet 235. For example, TCAM 248 may include rules that rewrite portions of the network packet 235 resulting in processed packet 235'. CPU 220 may program rules in TCAM 248, such as by programming/configuring ASIC 240. Network packet 235 may exit forwarding pipeline 245 as processed packet 235'.

Mirroring Logic 255

When the mirroring function is enabled for a port, mirroring logic 255 sends a copy of a network packet on the mirrored egress port to another egress port. According to some embodiments, mirroring logic 255 may comprise a mirroring table which may include one or more entries indicating a port to mirror from (e.g., source) and metadata to add to network packets from the source. An example mirroring table is illustrated in FIG. 5. CPU 220 may enable the mirroring function for a port and program the mirroring table, such as by programming/configuring ASIC 240.

In accordance with the present disclosure, mirroring logic 255 may optionally encapsulate the network packet to associate metadata with the mirrored network packet. The metadata may be used to inform CPU 220 how to process the network packet. For example, some network packets may be subject to analysis, some packets may be simply logged, some packets may increment certain counters, some packets may trigger an alarm, and so on. The metadata is described further in FIG. 5.

Recirculation Logic 250

When recirculation is enabled on a port, recirculation logic 250 intercepts network packets placed on that port and redirects the network packets to forwarding pipeline 245. Recirculation logic 250 in effect takes a packet on an egress port and turns the packet around (inside ASIC 240) so that the packet is treated as ingress traffic. In this way, a network packet written to an egress port gets recirculated to forwarding pipeline 245 rather than being transmitted from the egress port. The logical connection from the egress port to the forwarding pipeline (e.g., forwarding pipeline 245) may be referred to as a recirculation channel. CPU 220 may enable recirculation on a port, such as by programming/configuring ASIC 240.

Forwarding Pipeline 245

Forwarding pipeline 245 may apply a rule in TCAM 248 that is triggered when a network packet ingresses on the recirculation port. This rule may direct these packets to CPU 220. Alternatively, a rule in TCAM 248 may be triggered by packets which have unique metadata added by mirroring logic 255. This rule may direct these packets to CPU 220. In some embodiments, a rule in TCAM 248 is triggered when both of the above criteria are satisfied.

As described above, one TCAM rule may be used to send any network packets that ingress on the recirculation port to CPU 220. CPU 220 may separate and/or group the network packets if needed. For example, CPU 220 may analyze groups of packets with different instances of packet analyzer 225. Some embodiments are described further in FIG. 4. While multiple TCAM rules could be used to separate the network packets in various embodiments, using one TCAM rule as described above advantageously conserves TCAM resources. A size of TCAM 248 may be limited, for example, by a transistor limit or die size of ASIC 240. TCAM 248 may be a ternary content-addressable memory (TCAM). A TCAM is a type of high-speed memory that may search its entire contents in a single clock cycle. The term "ternary" refers to the memory's ability to store and query data using three different inputs: 0, 1 and X (i.e., "don't care"), which allows for partial matches. For example, TCAM 248 may store a routing table. Alternatively, TCAM 248 can be a content-addressable memory (CAM).

CPU 220

CPU 220 may analyze packets mirrored from egress port $270_Z$ in packet analyzer 225 for troubleshooting and analysis. For example, packet analyzer 225 may decode the packet's raw data and analyze its content. By way of non-limiting example, packet analyzer 225 may be tcpdump, Wireshark, and the like.

Figure 3A:
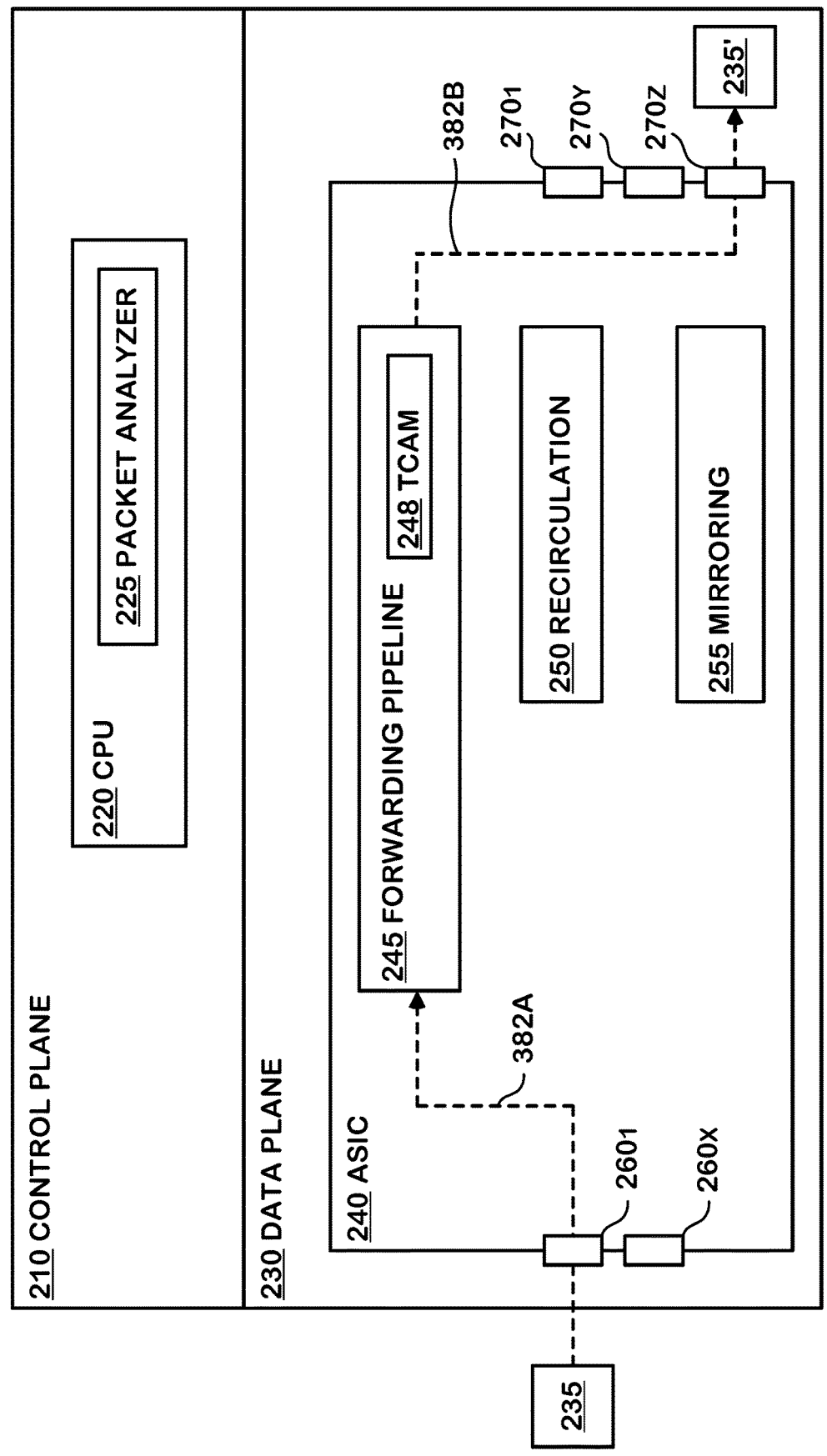
FIGS. 3A-3C depicts a simplified block diagram of a networking device according to some embodiments.
Figure 3B:
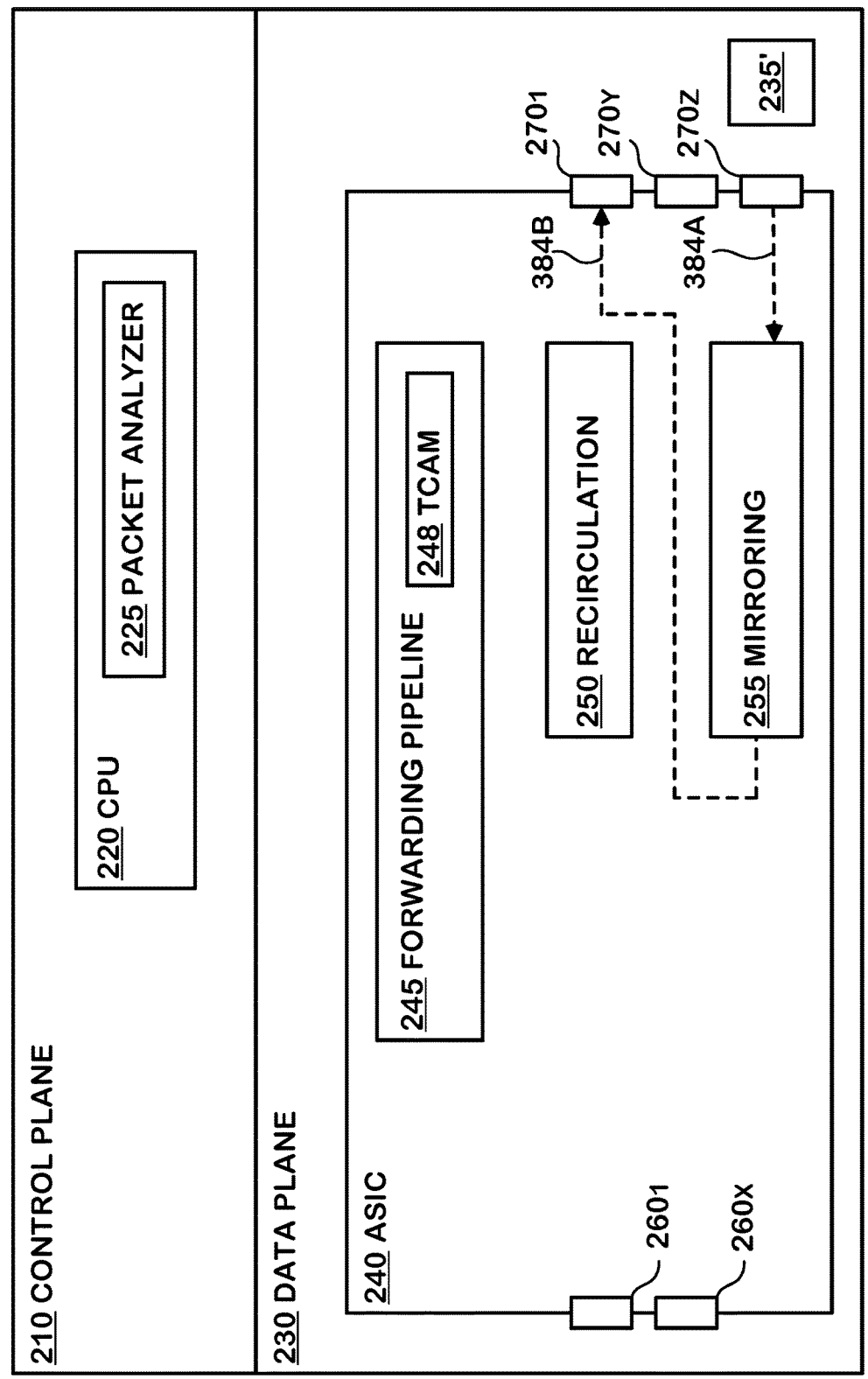
Figure 3C:
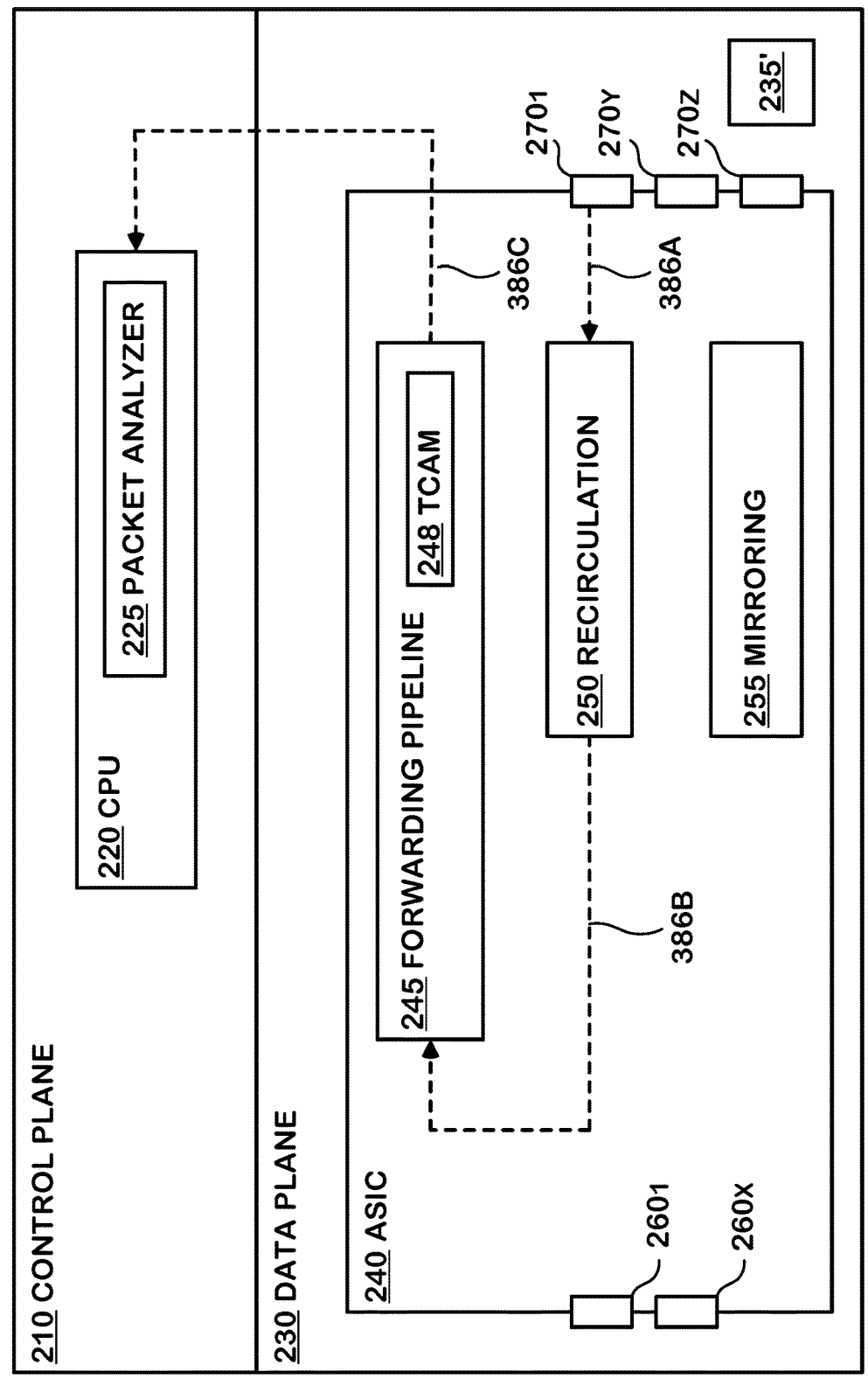

FIGS. 3A-3C are simplified block diagrams of network device 200. By way of example and not limitation, FIGS. 3A-3C illustrate egress mirroring packets to a central processing unit (CPU) in network device 200, according to some embodiments.

FIG. 3A depicts network packet 235 ingressing network device 200 through ingress port $260_1$ and entering forwarding pipeline 245 (path 382A). Network packet 235 may exit forwarding pipeline 245 as processed packet 235' and be transmitted from network device 200 on egress port $270_Z$ (path 382B).

FIG. 3B depicts packet 235' on egress port $270_Z$ being copied to port $270_1$ by mirroring logic 255 (paths 384A and 384B).

While egress port $270_Z$ may typically be a physical port of ASIC 240 that is communicatively coupled to a front-panel port of network device 200, egress port $270_1$ may be a physical port of ASIC 240 that may or may not be communicatively coupled to a front-panel port of network device 200, according to some embodiments. The front panel of a network device (e.g., network device 200) may be on an enclosure of the network device and include multiple Ethernet ports, modules containing other ports, a display, navigation buttons, indicator LEDs, and the like.

FIG. 3C shows recirculation logic 250 receiving a network packet on egress port $270_1$ (path 386A). When recirculation is enabled on a port, recirculation logic 250 intercepts network packets placed on that port and redirects the network packets to forwarding pipeline 245 (path 386B). Forwarding pipeline 245 may apply a rule in TCAM 248 to direct network packets (e.g., that ingress on a recirculation port) to CPU 220 (path 386C).

FIGS. 3A-3C illustrate one egress port being mirrored. In other embodiments, more than one egress port may be mirrored to the CPU so that the CPU can receive packets from multiple egress ports. For example, multiple egress ports can be concurrently mirrored to CPU 220 for processing by the same or different instances of packet analyzer 225. By way of a further non-limiting example, egress ports that work together in a link aggregation group (LAG) may be mirrored. LAG combines multiple egress ports together to make a single high-bandwidth data path, for example, to implement the traffic load sharing among the member ports in the group and to enhance the connection reliability.

Figure 4:
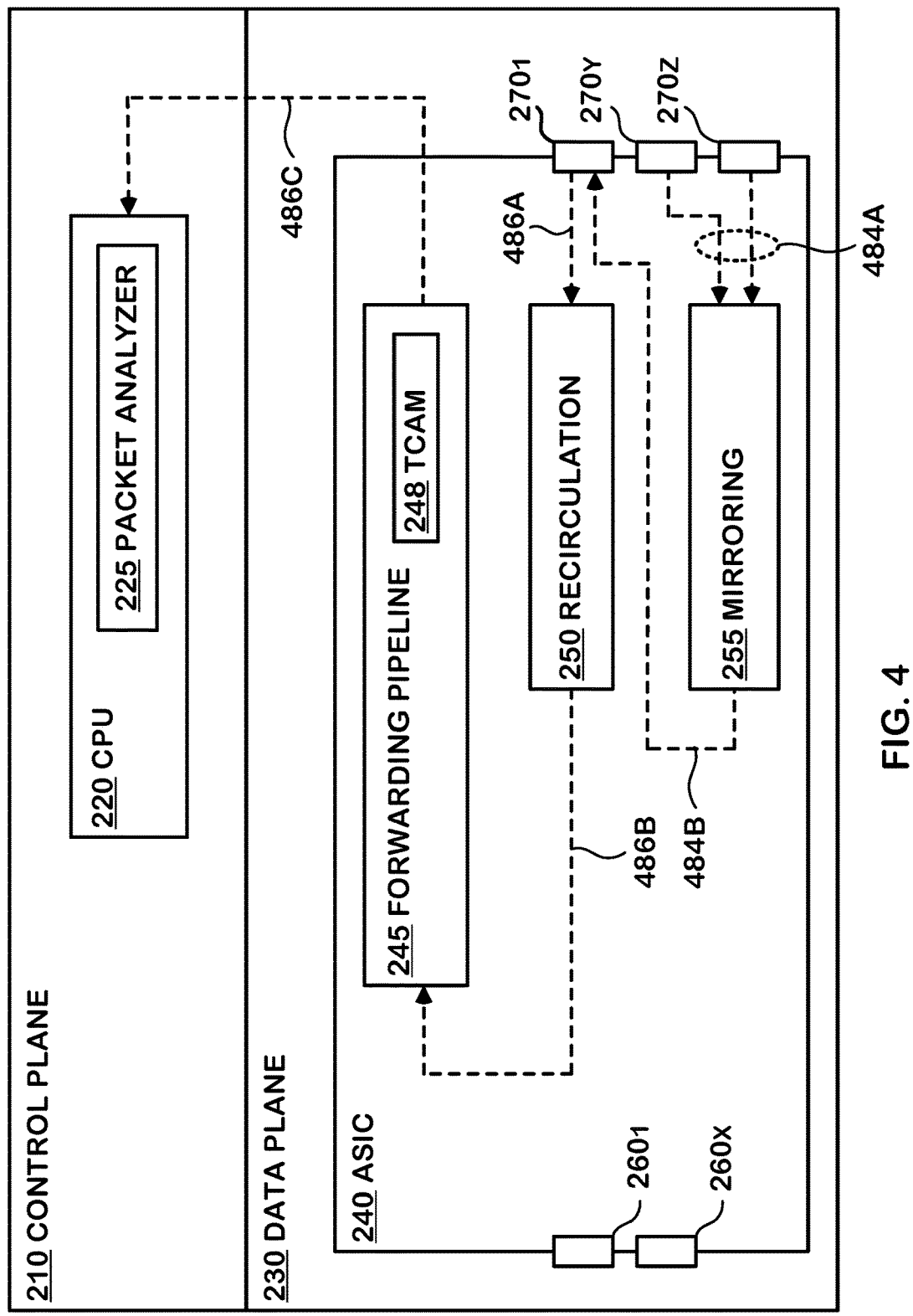
FIG. 4 illustrates a simplified block diagram of a networking device according to various embodiments.

FIG. 4 illustrates a block diagram of network device 200 in accordance with some embodiments. Although two egress ports (egress ports $270_Y$ and $270_Z$) are shown in the example of FIG. 4, more than two egress ports may be processed/handled as described below. As depicted in FIG. 4, network packets on egress ports $270_Y$ and $270_Z$ may be received by mirroring 255 (path 484A) and copied to egress port $270_1$ using mirroring logic 255 (path 484B). For example, egress ports $270_Y$ and $270_Z$ may be member ports of a LAG. In this way, network packets on egress ports $270_Y$ and $270_Z$ are said to be mirrored to egress port $270_1$. Mirroring logic 255 may optionally encapsulate the network packets to add metadata, for example, to enable CPU 220 to distinguish the mirrored packets (from each of egress ports $270_X$ and $270_Y$) from each other, group them together, and combinations thereof.

The mirrored network packets on egress ports $270_Y$ and $270_Z$ may be received by recirculation logic 250 (path 486A) and provided to forwarding pipeline 245 by recirculation logic 250 (path 486B). The mirrored packets on egress port $270_1$ are said to be recirculated (to forwarding pipeline 245). By using one recirculation interface for network packets from both egress ports $270_Y$ and $270_Z$ (i.e., multiple physical egress ports), just one physical port of ASIC 240 (egress port $270_1$)—and potentially a front panel port—is advantageously used (for recirculation). While egress ports $270_Y$ and $270_Z$ may typically be physical ports of ASIC 240 that are communicatively coupled to front-panel ports of network device 300, egress port $270_1$ may be a physical port of ASIC 240 that may or may not be communicatively coupled to a front-panel port of network device 200, according to some embodiments.

Forwarding pipeline 245 applies a rule in TCAM 248 to direct the network packets to CPU 220 (path 486C). In this way, packets on egress ports $270_Y$ and $270_Z$ may be mirrored to CPU 220. CPU 220 may analyze packets mirrored from egress ports $270_Y$ and $270_Z$ in one or more instances of packet analyzer 225 for troubleshooting and analysis.

As shown in FIG. 4, egress ports $270_Y$ and $270_Z$ may be mirrored to CPU 220. Mirroring sessions separate network packets based on their origin, such as egress ports $270_Y$ and $270_Z$. For example, network packets from egress port $270_Y$ may be grouped together as session1 and network packets from egress port $270_Z$ may be grouped together as session2. Network packets in session1 may be treated differently by CPU 220 from network packets in session2.

However, (without metadata) it may not be possible to differentiate the origin of a network packets arriving at CPU 220, which is a purpose of the mirroring sessions. Accordingly, mirroring logic 255 may add metadata (e.g., when encapsulating a network packet) to identify whether the network packet is part of session1 or session2. Turning to FIG. 5, mirroring table 500 may comprise two columns, a PORT column and a METADATA column. For each egress port (PORT) in mirroring table 500, corresponding metadata (METADATA) is applied.

As illustrated by FIG. 5, network packets (traffic) from egress port $270_Y$ (et1) may be encapsulated with metadata indicating the packets are a part of session1. Network packets from egress port $270_Z$ (et2) may be encapsulated with metadata indicating the packets are a part of session2, and so on. Moreover, multiple egress ports may belong to the same session, such as when they are in a LAG. For example, network packets from et3 and et4 are a part of session3. In various embodiments, data packets egressing through et3 and et4 may be processed and handled in network device 200 (FIG. 4) in a similar manner to data packet egressing egress port $270_Y$ (et1) and egress port $270_Z$ (et2)—except at least the metadata is different.

Each mirroring session is associated with a kernel interface at CPU 220 (FIG. 4). For example, session1 may be associated with mirror0, session2 may be associated with mirror1, and session3 may be associated with mirror2. By way of further non-limiting example, CPU 220 looks at the metadata, delivers session1 traffic to the mirror0 kernel interface, delivers session2 traffic to the mirror1 kernel interface, and delivers session3 traffic to the mirror2 kernel interface. At each kernel interface, different code or programs can be invoked to process the network packets from the associated mirroring session.

Figure 6:
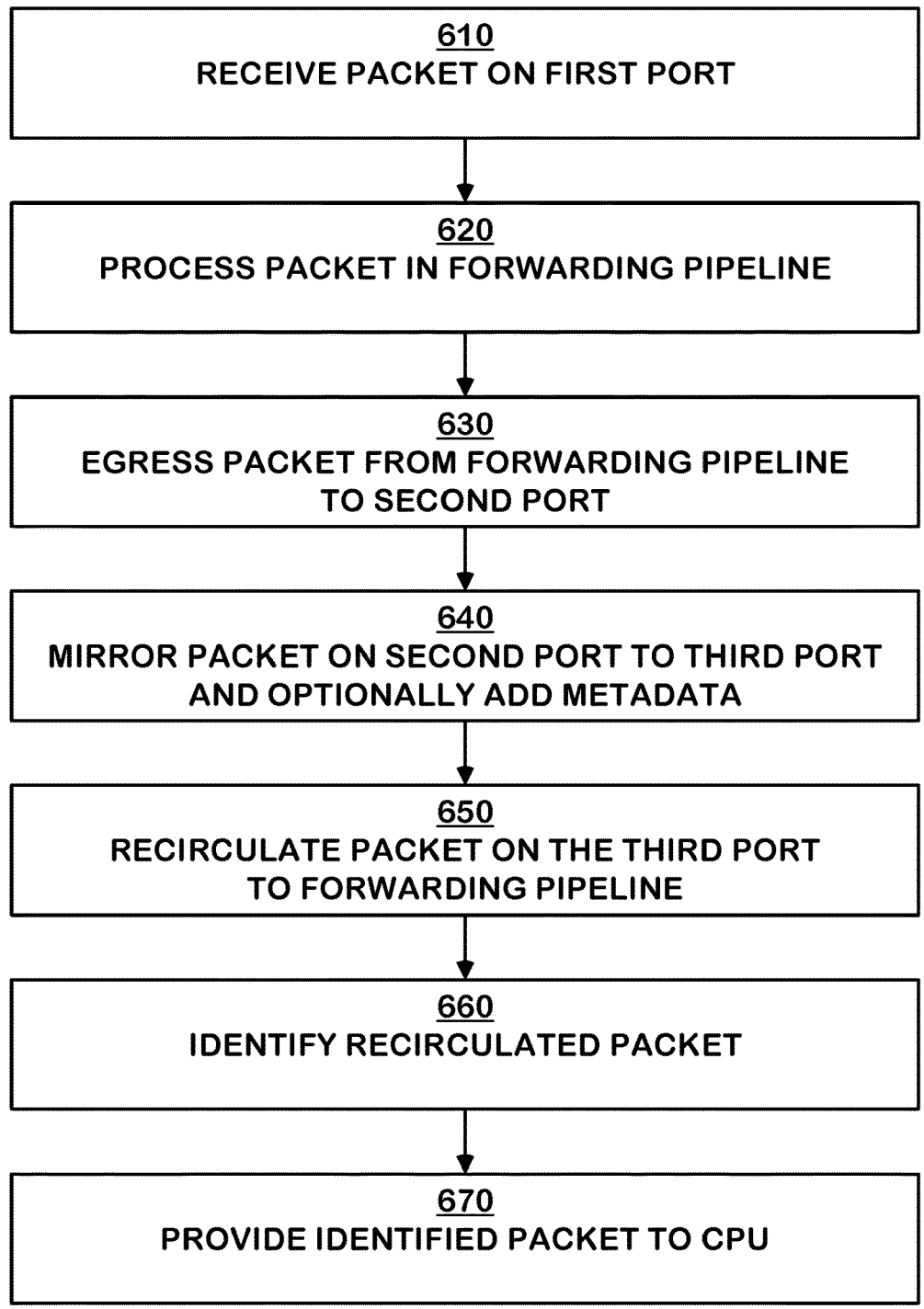
FIG. 6 shows a flow diagram of a method according to various embodiments.

FIG. 6 shows method 600 for egress mirroring a packet to a CPU, according to some embodiments. Method 600 may be performed by network device 100 (FIG. 1) and 200 (FIGS. 2, 3A-3C, and 4). Method 600 may commence at step 610 where a network packet may be received on a first port (e.g., ingress port) of a network device and passed to a forwarding pipeline. For example, network packet 235 is received on ingress port $260_1$ and passes to forwarding pipeline 245 (FIG. 3A) (path 382A). At step 620, the network packet may be processed in the forwarding pipeline, to determine a next hop for the network packet. For example, forwarding pipeline 245 can perform a lookup in a forwarding table to determine the next hop. One or more rules in TCAM 248 can be invoked to redirect and/or rewrite the network packet to produce processed network packet 235'.

At step 630, the network packet may be forwarded out of the network device through a second port (e.g., egress port) based on the processing in the forwarding pipeline. For example, network packet 235 exits forwarding pipeline 245 as processed network packet 235' and out of the network device through egress port $270_Z$ (FIG. 3A) (path 382B).

At step 640, the processed network packet on the second port is mirrored to a third port (e.g., another egress port). For example, processed network packet 235' on egress port $270_Z$ is mirrored to egress port $270_1$ (FIG. 3B) (paths 384A and 384B). Optionally at step 640, the mirrored packet is encapsulated to add metadata. At step 650, the mirrored packets on the third port are recirculated to the forwarding pipeline. For example, the mirrored packets on egress port $270_1$ are recirculated to forwarding pipeline 245 (FIG. 3C) (paths 386A and 386B).

At step 660, the recirculated packets are identified in the forwarding pipeline. In some embodiments, a TCAM rule is used to identify the recirculated packets; i.e., the TCAM rule can be keyed on the fact that the packet ingressed from the recirculation port. At step 670, the recirculated packets are provided to the CPU based on the action associated with the triggered TCAM rule (path 386C in FIG. 3C). In this way, packets from the second port are mirrored to the CPU. CPU 220 can run a packet analyzer on the packets from the second port.

Figure 7:
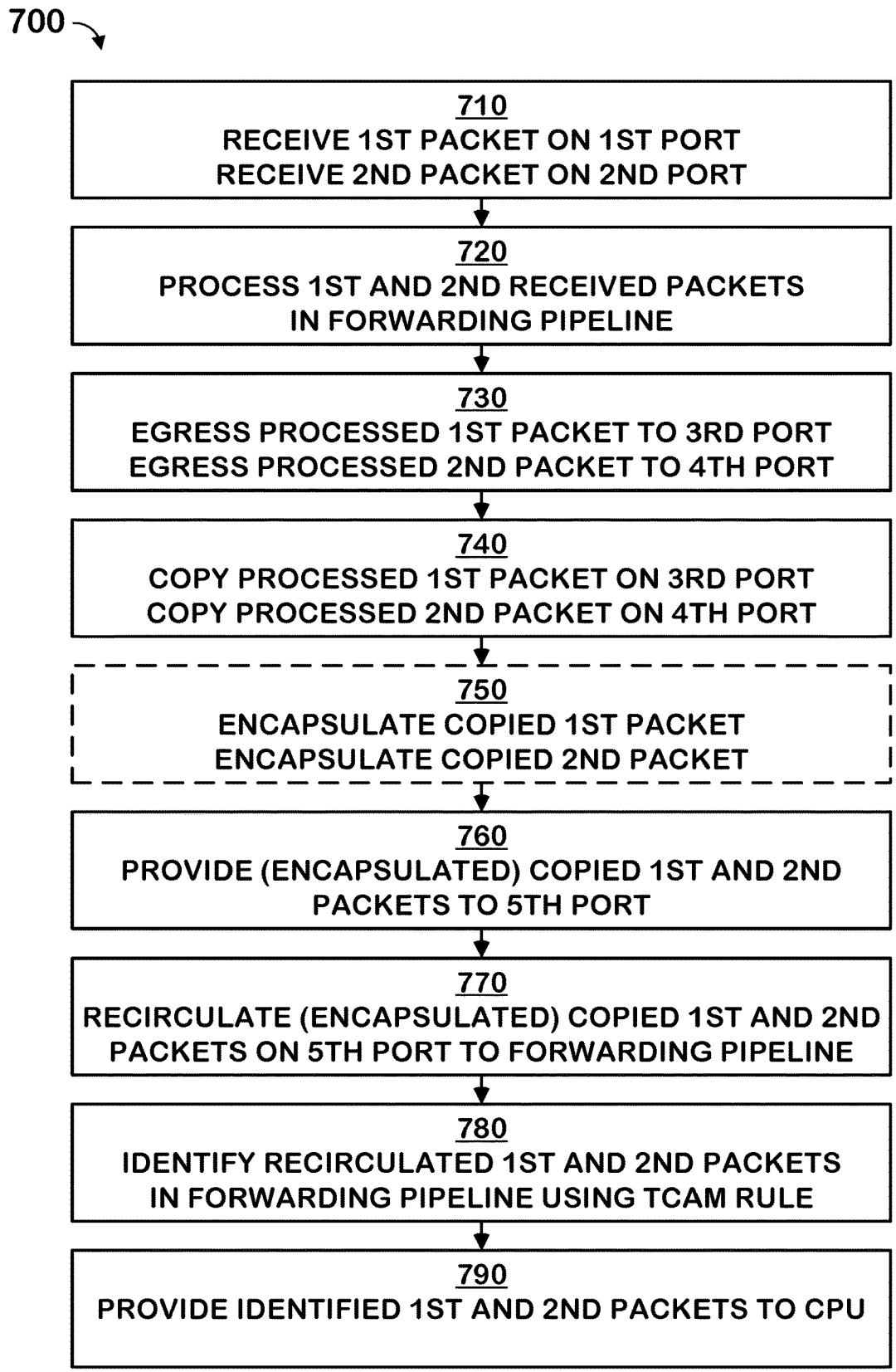
FIG. 7 illustrates a flow diagram of a method in accordance with some embodiments.

FIG. 7 depicts method 700 for mirroring packets from more than one egress port to a CPU, according to some embodiments. Method 700 may be performed by network device 100 (FIG. 1) AND 200 (FIGS. 2, 3A-3C, and 4). Method 700 may have at last some of the characteristics of method 600 (FIG. 6). Method 700 may commence at step 710 where a first network packet may be received on a first port (e.g., ingress port) and a second network packet may be received on a second port (e.g., ingress port) of a network device. The first and second network packet are provided to a forwarding pipeline. For example, the first network packet is received on ingress port $260_1$ and the second network packet is received on ingress port $260_X$, and the first and second network packets go to forwarding pipeline 245 (FIG. 4).

At step 720, the first and second network packets may be processed in the forwarding pipeline, such as to determine a next hop for the network packet using a routing table. For example, the network packets are processed in forwarding pipeline 245 (FIG. 4), producing a processed first network packet and a processed second network packet.

At step 730, the processed first network packet may be forwarded out of the network device through a third port (e.g., egress port) and the processed second network packet may be forwarded out of the network device through a fourth port (e.g., egress port) (respectively), based on the processing in the forwarding pipeline. For example, the processed first network packet exits forwarding pipeline 245 and out of network device 200 through egress port $270_Y$ and the processed second network packet exits forwarding pipeline 245 and out of the network device 200 through egress port $270_Z$ (FIG. 4).

Steps 740-760 may collectively mirror the processed first network packet on the third port and the processed second network packet on the fourth port to a fifth port. For example, the processed first network packet on egress port $270_Y$ and the processed second network packet on egress port $270_Z$ are mirrored to egress port $270_1$ (paths 484A and 484B) (FIG. 4). At step 740, the processed first network packet on the third port and the processed second network packet on the fourth port are copied. For example, the processed first network packet on egress port $270_Y$ and the processed second network packet on egress port $270_Z$ are provided to mirroring logic 255.

Optionally at step 750, the copied first network packet and the copied second network packet may be encapsulated to add metadata. The metadata, for example, may enable a CPU (e.g., CPU 220 in FIG. 4) to distinguish the mirrored packets (from each port) from each other, group them together, and combinations thereof. A mirroring table, sessions, and metadata are described in FIG. 5. At step 760, the copied (encapsulated) first network packet and the copied (encapsulated) second network packet are provided to a fifth port, producing a mirrored first network packet and a mirrored second network packet, respectively. For example, the copied (encapsulated) first network packet and the copied (encapsulated) second network packet are provided to egress port $270_1$.

At step 770, the mirrored packets on the fifth port are recirculated to the forwarding pipeline. For example, the mirrored network packets on egress port $270_1$ are recirculated to forwarding pipeline 245 (paths 486A and 486B) (FIG. 4).

At step 780, the recirculated packets are identified in the forwarding pipeline. In some embodiments, a TCAM rule is used to identify the recirculated packets (as to be sent to the CPU). For example, a rule in TCAM 248 identifies the recirculated packets (as to be sent to CPU 220) (FIG. 4). At step 790, the recirculated packets are provided to the CPU based on the TCAM rule. For example, CPU 220 receives packets from forwarding pipeline 245 based on a rule in TCAM 248. In this way, packets from the third and fourth ports are mirrored to the CPU. CPU 220 may run a packet analyzer on the packets from the third and fourth ports.

Examples

In accordance with some embodiments, a method in a switch may include: processing ingress packets in a forwarding pipeline; egressing one or more packets from the forwarding pipeline to a first physical port of the switch; mirroring the one or more packets on the first physical port to a second physical port of the switch; recirculating the one or more packets on the second physical port to the forwarding pipeline, wherein the one or more packets on the second physical port become ingress packets on the second physical port and processing the recirculated one or more packets in the forwarding pipeline includes identifying packets that ingress on the second physical port; and sending the identified packets to a central processing unit (CPU) in the switch.

In some embodiments, wherein the method further comprises using a ternary content-addressable memory (TCAM) rule to identify packets that ingress on the second physical port.

In some embodiments, wherein the method further comprises adding information to the one or more mirrored packets to distinguish different kinds of packets, wherein the CPU processes the packets according to the added information.

In some embodiments, wherein the method further comprises egressing a different one or more packets from the forwarding pipeline to a third physical port of the switch; and mirroring the second packets on the third physical port to a fourth physical port of the switch, wherein the mirroring adds second information to the mirrored second packets to distinguish different kinds of packets.

In some embodiments, wherein the mirroring adds information to the mirrored packets from the third physical port and the first physical port, the information distinguishes the mirrored packets from the third physical port from the mirrored packets from the first physical port, and the CPU processes the identified packets according to the added information.

In some embodiments, wherein the CPU analyzes the identified packets, including decoding raw data of the identified packets.

In accordance with various embodiments, the present disclosure may include a switch comprising: a processor; and a memory communicatively coupled to the processor, the memory storing instructions executable by the processor to program a data plane circuit to perform a method, the method comprising: mirroring one or more packets on a first physical port to a second physical port of the switch; recirculating the one or more packets on the second physical port to a forwarding pipeline, wherein the one or more packets on the second physical port become ingress packets on the second physical port; and identifying, in the forwarding pipeline, packets that ingress on the second physical port; and sending the identified packets to a central processing unit (CPU) in the switch.

In various embodiments, wherein the method further comprises using a ternary content-addressable memory (TCAM) rule to identify packets that ingress on the second physical port.

In various embodiments, wherein the method further comprises adding information to the one or more mirrored packets to distinguish different kinds of packets, wherein the CPU processes the packets according to the added information.

In various embodiments, wherein the method further comprises: egressing a different one or more packets from the forwarding pipeline to a third physical port of the switch; and mirroring the one or more packets on the third physical port to the second physical port of the switch.

In various embodiments, wherein the mirroring adds information to the mirrored packets from the third physical port and the mirrored packets from the first physical port, the information distinguishing the mirrored packets from the third physical port from the mirrored packets from the first physical port, the CPU processing the identified packets according to the added information.

In various embodiments, wherein the mirroring adds information to the mirrored packets from the third physical port and the mirrored packets from the first physical port, the information grouping the mirrored packets from the third physical port together and the mirrored packets from the first physical port together, the CPU processing the identified packets according to the added information.

In various embodiments, wherein the CPU analyzes the identified packets, including decoding raw data of the identified packets.

In various embodiments, wherein the CPU performs a loopback test of a media access controller of the switch using the identified packets.

In accordance with certain embodiments, the present disclosure includes a switch comprising: a mirroring circuit, the mirroring circuit copying one or more packets on a first physical port to a second physical port of the switch; a recirculation circuit, the recirculation circuit providing the one or more packets on the second physical port to a forwarding pipeline, wherein the one or more packets on the second physical port become ingress packets on the second physical port; and the forwarding pipeline, the forwarding pipeline identifying packets that ingress on the second physical port and sending the identified packets to a central processing unit (CPU) in the switch.

In certain embodiments, the switch further comprising a ternary content-addressable memory (TCAM), the TCAM storing a rule used by the forwarding pipeline to identify packets that ingress on the second physical port.

In certain embodiments, wherein the mirroring circuit further adds information to the one or more mirrored packets to distinguish different kinds of packets and the CPU processes the packets according to the added information.

In certain embodiments, wherein the mirroring circuit further copies a different one or more packets on a third physical port to the second physical port of the switch.

In certain embodiments, wherein the mirroring adds information to the mirrored packets from the third physical port and the mirrored packets from the first physical port, the information is used by the CPU to distinguish the mirrored packets from the third physical port from the mirrored packets from the first physical port, the CPU processing the identified packets according to the added information.

In certain embodiments, wherein the mirroring adds information to the mirrored packets from the third physical port and the mirrored packets from the first physical port, the information is used by the CPU to group the mirrored packets from the third physical port together and the mirrored packets from the first physical port together, the CPU processing the identified packets according to the added information.

In certain embodiments, wherein the CPU analyzes the identified packets, including decoding raw data of the identified packets.

What is claimed is:

1. A method in a switch comprising:
   processing ingress packets in a forwarding pipeline;
   egressing one or more packets from the forwarding pipeline to a first physical port of the switch;
   mirroring the one or more packets on the first physical port to a second physical port of the switch;
   recirculating the one or more packets on the second physical port to the forwarding pipeline, wherein the one or more packets on the second physical port become ingress packets on the second physical port and processing the recirculated one or more packets in the forwarding pipeline includes identifying packets that ingress on the second physical port; and
   sending the identified packets to a central processing unit (CPU) in the switch.

2. The method of claim 1 further comprising using a ternary content-addressable memory (TCAM) rule to identify packets that ingress on the second physical port.

3. The method of claim 1 further comprising adding information to the one or more mirrored packets to distinguish different kinds of packets, wherein the CPU processes the packets according to the added information.

4. The method of claim 3 further comprising:
   egressing a different one or more packets from the forwarding pipeline to a third physical port of the switch; and
   mirroring the one or more packets on the third physical port to the second physical port of the switch.

5. The method of claim 4 wherein:
   the mirroring adds information to the mirrored packets from the third physical port and the first physical port,
   the information distinguishes the mirrored packets from the third physical port from the mirrored packets from the first physical port, and
   the CPU processes the identified packets according to the added information.

6. The method of claim 1 wherein the CPU analyzes the identified packets, including decoding raw data of the identified packets.

7. A switch comprising:
   a processor; and
   a memory communicatively coupled to the processor, the memory storing instructions executable by the processor to configure a data plane circuit to perform a method, the method comprising:
   mirroring one or more packets on a first physical port to a second physical port of the switch;

recirculating the one or more packets on the second physical port to a forwarding pipeline, wherein the one or more packets on the second physical port become ingress packets on the second physical port;

identifying, in the forwarding pipeline, packets that ingress on the second physical port; and sending the identified packets to a central processing unit (CPU) in the switch.

8. The switch of claim 7 wherein the method further comprises using a ternary content-addressable memory (TCAM) rule to identify packets that ingress on the second physical port.

9. The switch of claim 7 wherein the method further comprises adding information to the one or more mirrored packets to distinguish different kinds of packets, and the CPU processes the packets according to the added information.

10. The switch of claim 9 wherein the method further comprises:

egressing a different one or more packets from the forwarding pipeline to a third physical port of the switch; and mirroring the one or more packets on the third physical port to the second physical port of the switch.

11. The switch of claim 10 wherein the mirroring adds information to the mirrored packets from the third physical port and the mirrored packets from the first physical port, the information distinguishing the mirrored packets from the third physical port from the mirrored packets from the first physical port, the CPU processing the identified packets according to the added information.

12. The switch of claim 10 wherein the mirroring adds information to the mirrored packets from the third physical port and the mirrored packets from the first physical port, the information grouping the mirrored packets from the third physical port together and the mirrored packets from the first physical port together, the CPU processing the identified packets according to the added information.

13. The switch of claim 7 wherein the CPU analyzes the identified packets, including decoding raw data of the identified packets.

14. A switch comprising:

a mirroring circuit, the mirroring circuit copying one or more packets on a first physical port to a second physical port of the switch;

a recirculation circuit, the recirculation circuit providing the one or more packets on the second physical port to a forwarding pipeline, wherein the one or more packets on the second physical port become ingress packets on the second physical port; and the forwarding pipeline, the forwarding pipeline identifying packets that ingress on the second physical port and sending the identified packets to a central processing unit (CPU) in the switch.

15. The switch of claim 14 further comprising a ternary content-addressable memory (TCAM), the TCAM storing a rule used by the forwarding pipeline to identify packets that ingress on the second physical port.

16. The switch of claim 14 wherein the mirroring circuit further adds added information to the one or more mirrored packets to distinguish different kinds of packets and the CPU processes the packets according to the added information.

17. The switch of claim 16 wherein the mirroring circuit copies a different one or more packets on a third physical port to the second physical port of the switch.

18. The switch of claim 17 wherein the mirroring adds information to the mirrored packets from the third physical port and the mirrored packets from the first physical port, the information is used by the CPU to distinguish the mirrored packets from the third physical port from the mirrored packets from the first physical port, the CPU processing the identified packets according to the added information.

19. The switch of claim 17 wherein the mirroring adds information to the mirrored packets from the third physical port and the mirrored packets from the first physical port, the information is used by the CPU to group the mirrored packets from the third physical port together and the mirrored packets from the first physical port together, the CPU processing the identified packets according to the added information.

20. The switch of claim 14 wherein the CPU analyzes the identified packets, including decoding raw data of the identified packets.

* * * * *